United States Patent [19]

Miller

[11] Patent Number: 5,356,164
[45] Date of Patent: Oct. 18, 1994

[54] SEAMLESS GUTTER ROLLING SUPPORT

[76] Inventor: Chase E. Miller, 220 Avon St., La Crosse, Wis. 54603

[21] Appl. No.: 65,128

[22] Filed: May 20, 1993

[51] Int. Cl.$^5$ .............................................. B62B 1/26
[52] U.S. Cl. .............................. 280/79.6; 280/47.131; 280/656; 269/17
[58] Field of Search ................ 280/656, 79.6, DIG. 6, 280/646, 652, 47.131; 269/17, 909; 248/129

[56] References Cited

U.S. PATENT DOCUMENTS

| | | | |
|---|---|---|---|
| 1,515,915 | 11/1924 | Valenta | 269/17 |
| 2,538,365 | 1/1951 | Jones | 269/17 |
| 2,685,449 | 8/1954 | Levin | 280/79.6 X |
| 4,564,178 | 1/1986 | Steffe | 269/17 |
| 4,899,566 | 2/1990 | Knudson | 72/129 |
| 4,926,722 | 5/1990 | Sorensen et al. | 81/487 |
| 5,037,118 | 8/1991 | Straube | 280/79.6 |
| 5,180,184 | 1/1993 | Chiu | 280/DIG. 6 X |
| 5,219,175 | 6/1993 | Woelfel | 280/79.6 X |

FOREIGN PATENT DOCUMENTS

| | | | |
|---|---|---|---|
| 0900377 | 6/1945 | France | 280/79.6 |
| 2224701 | 5/1990 | United Kingdom | 280/79.6 |

*Primary Examiner*—Richard M. Camby
*Assistant Examiner*—Carla Mattix
*Attorney, Agent, or Firm*—Quarles & Brady

[57] ABSTRACT

An apparatus for supporting a seamless gutter as it is being formed has a frame with two clamps longitudinally spaced apart in the direction of travel of the gutter and two ground engagement wheels longitudinally positioned between the clamps and laterally positioned on opposite sides of the gutter so as to support the gutter on the ground as the apparatus travels with the gutter being formed. Preferably, the apparatus is foldable to a collapsed storage position.

8 Claims, 2 Drawing Sheets

SEAMLESS GUTTER ROLLING SUPPORT

BACKGROUND OF THE INVENTION

1. Field of the Invention

The invention relates to an apparatus for supporting a seamless gutter as it is being formed.

2. Discussion of the Prior Art

When gutters for collecting rain water from the roofs of new or existing houses are installed, seamless gutters are often used. With these types of gutters, the installation procedure is normally for the installer to take his truck to the job site and form the seamless gutter there. Typically, the installer has a gutter roll forming machine in the back of his truck into which he feeds a strip of sheet metal off a coil. The roll forming machine forms the flat strip into the cross section of the gutter in a continuous operation to any desired length. For example, gutters of this type may typically be formed up to 250–300 feet long, and are only limited in length by the length of the flat strip. Such gutter forming operations and machines are well known.

As the roll formed gutter is fed out the back of the truck as it is being formed, it quickly reaches a length at which it cannot support itself. Previously, a tripod type support was used to support the gutter as it was fed out the back of the truck. The tripod type support was stood on the ground and had a lubricious surface over which the gutter slid as the gutter traveled past the support. This means of supporting the gutter as it was being formed was generally acceptable but required periodic moving of the support as the length of gutter out the back of the truck increased. Thus, a need exists for a better method for supporting a seamless gutter as it is being formed.

SUMMARY OF THE INVENTION

The invention provides an apparatus for supporting a seamless gutter as it is being formed having a frame, a clamp secured to the frame for releasable attachment to the gutter and a rotatable wheel secured to the frame for rolling engagement with a ground surface as the gutter is being formed. Thereby, the frame supports the gutter above the ground surface and travels with the gutter as the gutter is being formed so that little or no attention must be paid to supporting the gutter as it is being fed out from the gutter forming machine.

Preferably, the apparatus has two wheels and the wheels are laterally spaced apart with one of the wheels on one side of the gutter and another of the wheels on an opposite side of the gutter when the apparatus is clamped to the gutter. As such, the apparatus is highly maneuverable, laterally stable and does not place undue lateral or vertical loads on the gutter, but is guided by the gutter as it supports and moves with the gutter. Aligning the two wheels along a lateral axis also helps reduce torsional loads which may otherwise be placed on the gutter.

In another aspect, the apparatus preferably has two clamps which are longitudinally spaced apart in the direction of travel of said gutter with one of the clamps in front of the wheels and the other clamp behind the wheels. This is especially useful to help steer the support without applying undue vertical bending loads on the gutter.

In another preferred aspect, the apparatus is foldable to a collapsed position for compact storage and transport when it is not in operation.

DETAILED DESCRIPTION OF THE PREFERRED EMBODIMENTS

Figure 1:
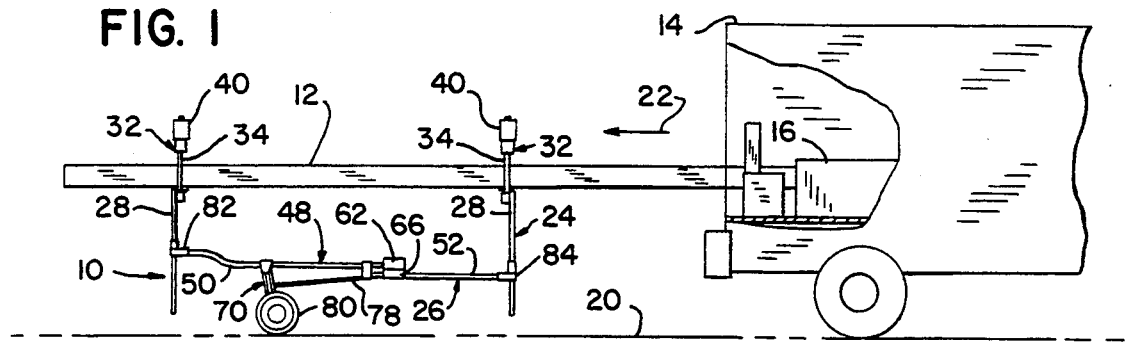
FIG. 1 is a schematic side elevation view illustrating a support of the invention in operation.
Figure 5:
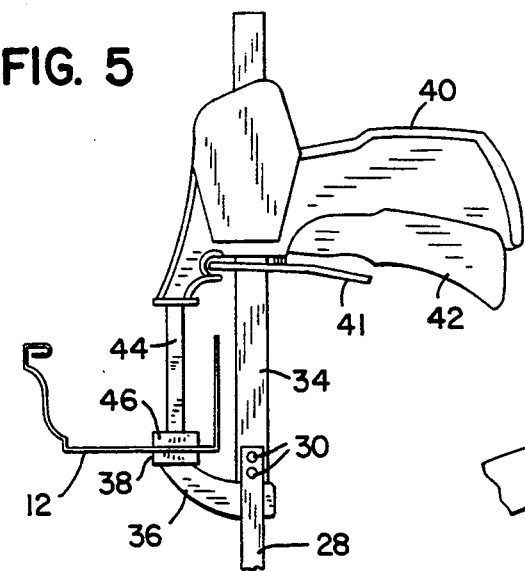
FIG. 5 is a front elevation view illustrating a clamp used in the support of FIG. 1.

FIG. 1 illustrates a rolling support 10 of the invention in operation. In operation, the support 10 is clamped to a section of gutter 12 which is being fed out the back of a truck 14 by a gutter forming machine 16 which is inside the truck 14. The gutter forming machine 16 continuously forms a flat strip of sheet metal into a gutter cross-section (see the cross-section of gutter 12 shown in FIG. 5). As such, the gutter 12 can be made up to any length as the need requires limited only by the length of the flat strip of sheet metal fed into the gutter forming machine 16. Since the flat strip of sheet metal can be coiled on a roll inside the truck, it can be very long (e.g., 1100 feet). Thus, the gutter 12 can be formed to a great length, depending upon the length needed to be installed on the roof line of a house or other structure needing a gutter. Gutter forming machines such as the machine 16 are well known (See, for example, U.S. Pat. No. 4,899,566) and are commercially available from manufacturers such as Knudson Mfg., Inc. of Broomfield, Colo. and Jacobs Roll Forming Products of Arvada, Colo. It should be understood, however, that the invention is not limited to use with any specific gutter forming machine but could be applied to any gutter forming machine in which a traveling section of gutter must be supported as it is being formed.

In FIG. 1, the truck 14 would typically be parked on a ground surface such as a road surface 20 and the rolling support 10 would travel along the road surface 20 in the direction shown by arrow 22. As used herein, arrow 22 denotes the forward direction (even though out the back of truck 14) since it is forward relative to the direction of travel of the support 10 and gutter 12. Under proper forming conditions, the machine 16 feeds the gutter 12 along a substantially straight path and the gutter 12 because of its cross-section (FIG. 5) has sufficient beam strength to maintain a straight path even a substantial distance from the truck 14. While only one apparatus 10 is shown supporting the gutter 12, it should be understood that more than one could be used, depending on the length of gutter to be supported.

Figure 2:
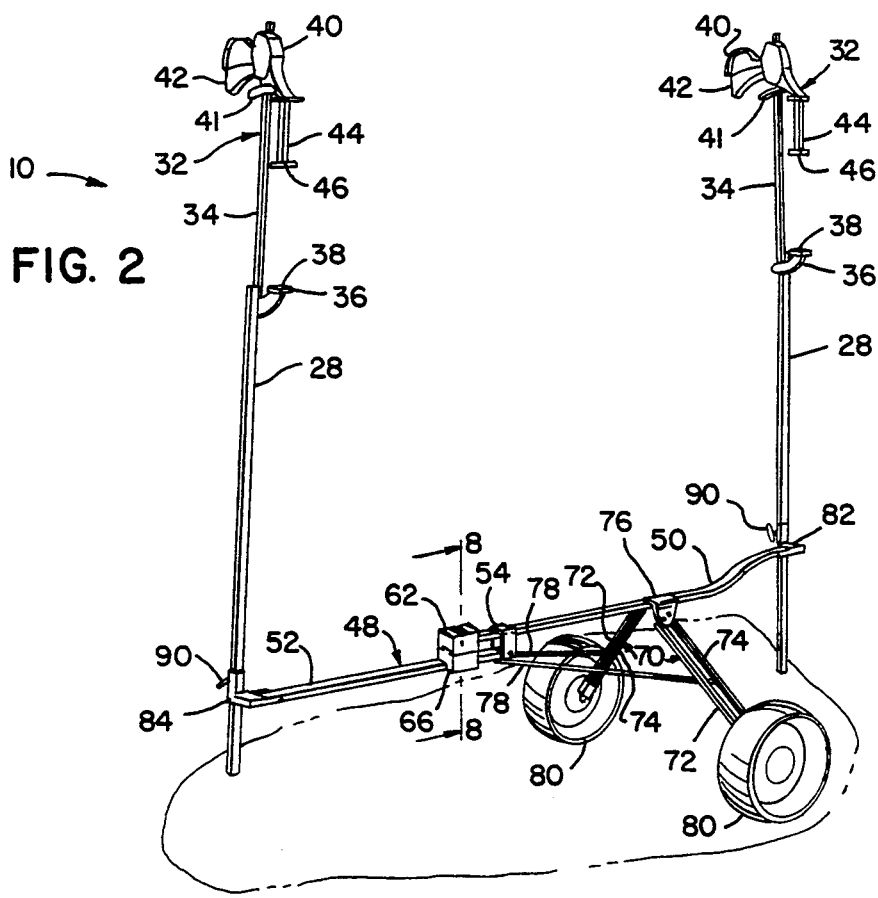
FIG. 2 is a perspective view of the support shown in FIG. 1 in the operational position.

The support 10 has a frame 24 which includes a chassis 26 and clamp uprights 28. The clamp uprights 28 are pivotally connected to the ends of the chassis 26 and at their upper ends are fixedly secured by screws 30 (FIGS. 4 and 5) to bar clamps 32. The bar clamps 32 are vertically oriented in the operational position of the support 10 (shown in FIGS. 1 and 2) and are mounted with their bars 34 on one side of the chassis 26 so that their throats open from the respective bar toward the chassis 26. Each bar clamp 32 has a lower foot 36 which extends from the associated bar 34 toward and over the chassis 26 and supports the gutter 12 from the underside of the gutter 12, generally balanced over the chassis 26. Preferably, a soft rubber pad 38 is provided over the top surface of the foot 36 so as to prevent scratching the gutter 12.

The lower end of each bar 34 is fixed to the associated foot 36 and the bar 34 extends vertically upwardly therefrom. Slidably attached to each bar 34 is a handle 40 which may be slid vertically along the associated bar 34 and secured in position at any desired position along the associated bar 34 by operating triggers 41 and 42. Trigger 41 is for quickly sliding handle 40 along the bar 34 (up or down) and trigger 42 is for ratcheting the handle 40 along the bar 34 (downwardly only) so as to tighten the grip of the clamp 32 on the gutter 12.

An extension 44 is secured to each handle 40 and extends downwardly therefrom toward the associated foot. At the lower end of the extension 44, a shoe 46 is attached to the extension 44 which is in substantial vertical alignment with the foot 36 so as to clamp the bottom wall of the gutter 12 between the shoe 46 and the foot 36. Preferably, the shoe 46 is covered with a soft rubber or plastic pad to prevent scratching the gutter 12.

The portion of the bar clamp 32 including the foot 36, the bar 34, and the handle 40 (but not the extension 44) is commercially available from American Tool Companies, Inc., Lincoln, Nebr., under the commercial designation Quick-Grip ®. A similar quick-action bar clamp is also described in U.S. Pat. No. 4,926,722 which issued May 22, 1990.

The extension 44 may be affixed to the handle 40 by any suitable means, such as by forming a piece of sheet metal around the shoe provided with the commercially available handle 40 and gluing the formed sheet metal thereto. The vertically extending stem portion of the extension 44 can be welded to the formed sheet metal piece and a flat plate welded to the bottom of the stem portion of the extension 44 so as to form the shoe 46, with a soft pad preferably installed over the plate as stated above.

The chassis 26 includes a longitudinally extending spine 48 which has a front bar 50 and a rear bar 52. Bracket 54 is fixed to the rear portion of front bar 50 by rivets 56. A bolt 58 secured by a lock nut 60 pivotally connects the forward end of rear bar 52 to the bracket 54 so as to pivot the bar 52 relative to the bar 50 generally in the plane defined by the spine 48 and clamp uprights 28. A female dovetail block 62 is fixedly secured to the rearward end of bar 50 by screw 64 and a male dovetail block 66 is slidable on bar 52 so as to have its male dovetail received in the female dovetail slot of block 62 when the two blocks 62 and 66 are engaged with one another. Engaging the blocks 62 and 66 with one another fixes the bars 50 and 52 against pivoting with respect to one another about bolt 58 so as to secure the operational position of the spine 48 shown in FIGS. 1 and 2.

The chassis 26 also includes a pair of legs 70 both of which extend downwardly in the operational position to opposite sides of the spine 48. Each leg 70 includes two parallel bars 72 and 74 each of which is pivotally connected at its upper end to a bracket 76 which is secured to the bar 50. A tie rod 78 is provided for each leg 70 which has its rearward end pivotally connected to the bar 52 and its forward end pivotally connected to an associated bar 74. The tie rods 78 pivot the legs 70 to their outboard operational positions (shown in FIGS. 1 and 2) when the bar 52 is pivoted to its operational position relative to bar 50, as further hereinafter described.

A wheel 80 is rotatably mounted at the lower end of each leg 70 so as to engage surface 20 in rolling contact. Any suitable axle and bearings may be provided to rotatably mount each wheel 80 to its associated leg 70.

In the preferred embodiment illustrated, the chassis 26, including the spine 48, legs 70, tie rods 78 and wheels 80, is an adaptation of a device which is commercially sold as a golf cart. The golf cart is commercially available from Harbaugh and Lee Industries, Taipei, Taiwan, under the commercial designation Compact Model 830. Such a golf cart and others of this type are particularly well suited to application in the invention because they: are foldable to a compact storage position; have a relatively long and straight spine so that the clamp uprights can be spaced relatively far apart; are lightweight but strong; have two spaced wheels so as to be highly maneuverable but laterally stable; and do not place undo lateral loads on the gutter 12 as it is being formed.

As shown in FIG. 1, the support 10 is clamped to the gutter 12 with the bar 50 in front and the bar 52 in back. This is the preferred orientation since the wheels 80 are not in the middle of the spine 48 but are spaced closer to the extending end of the bar 50 than to the extending end of the bar 52. Thus, the natural balance of the support 10 is to tip the extending end of the bar 52 toward the ground. In the orientation as shown in FIG. 1, the gutter 12 is supported by the gutter forming machine 16 at its rearward end, and by the forward-most clamp 32 with the rearward-most clamp 32 keeping the spine of chassis 26 generally aligned with the gutter 12 to provide for proper steering of the support 10 as the support 10 and gutter 12 travel forwardly. While this is the preferred orientation, it would also be possible to clamp the support 10 to the gutter 12 with the bar 52 in front and the bar 50 in back.

Figure 6:
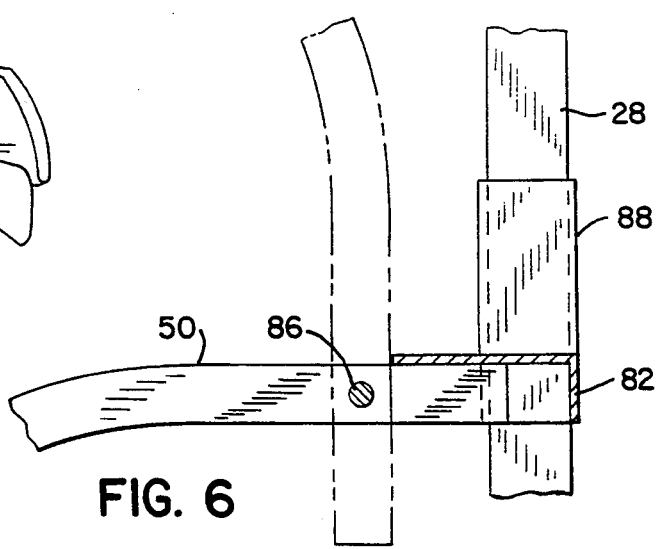
FIG. 6 is a sectional view illustrating how clamp uprights of the apparatus are hinged to a chassis of the apparatus.

The clamp uprights 28 are pivotally secured to the respective extending ends of the bars 50 and 52 using brackets 82 and 84. Each bracket 82 and 84 is pivotally secured to its respective end of the chassis 26 with a bolt 86 and an associated locknut (not shown). Referring to FIG. 6, which shows the bracket 82 (it should be understood that the bracket 84 is constructed and pivots in a similar manner), the bracket 82 is pivotable relative to the bar 50 in the manner shown, the operational position being shown in solid lines and a collapsed position shown in phantom lines. Each bracket 82 and 84 has a square tubular slideway 88 into which the corresponding clamp upright 28 is slidably received. A set screw 90 is threaded into the wall of the slideway 88 and can be tightened against the associated clamp upright 28 so as to secure its vertical position relative to the slideway 88. In this manner, the vertical height of the clamps 32 can be adjusted. It is noted that when the brackets 82 and 84 are in their operational positions, they naturally stay in a generally vertical orientation, being supported on the upper surface of the associated bars 50 and 52, as shown in FIG. 6 with respect to the bracket 82.

Figure 7:
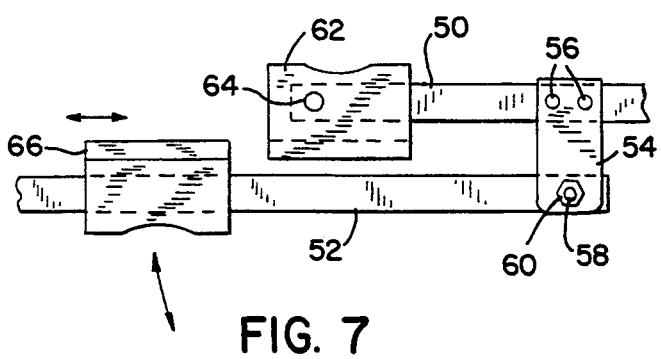
FIG. 7 is a partial elevation view of a portion of the chassis illustrating how the chassis is locked or unlocked from the operational position.
Figure 8:
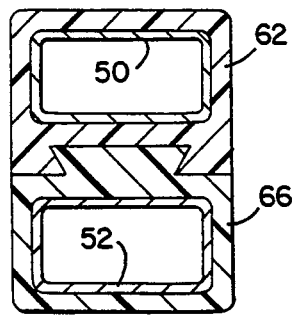
FIG. 8 is a cross-sectional view taken along the plane of the line 8—8 of FIG. 2.
Figure 4:
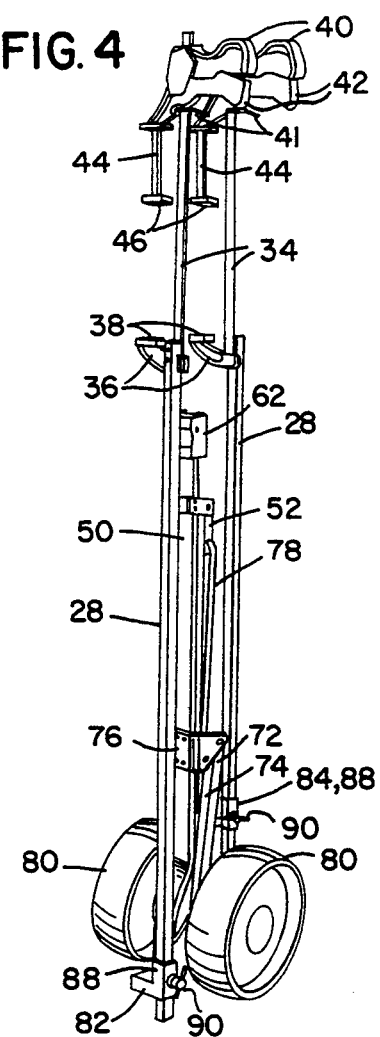
FIG. 4 is a perspective view of the support of FIG. 1 shown in a fully collapsed position.
Figure 3:
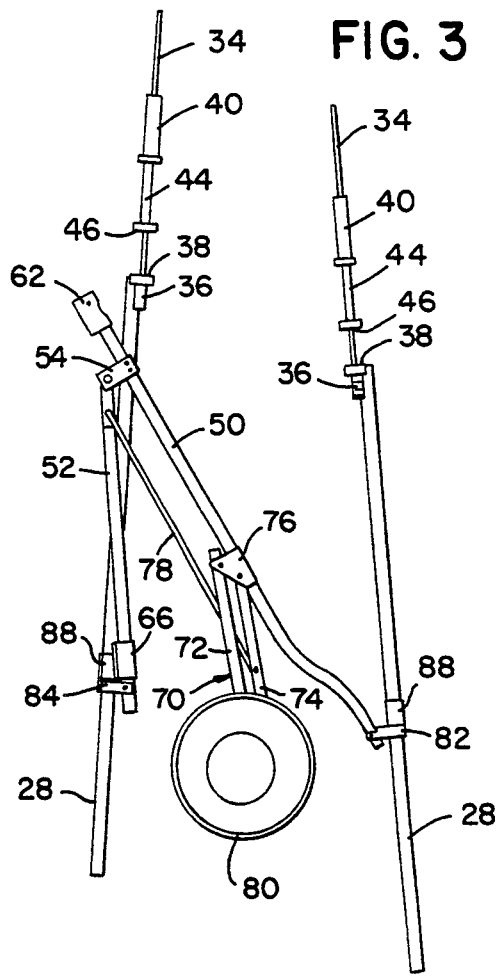
FIG. 3 is a side elevation view of the support of FIG. 1 shown in a partially collapsed position.

The support 10 can be folded from the operational position (shown in FIGS. 1 and 2) to a partially collapsed position shown in FIG. 3 and to a fully collapsed position shown in FIG. 4. The first step in folding the support 10 is to release the two dovetail blocks 66 and 64 from one another. Then, the bar 52 can be folded relative to the bar 50 by pivoting it counterclockwise (as viewed in FIGS. 3 and 7) about bolt 58. This causes tie rods 78 to pivot legs 70 forwardly and inwardly (toward the extending end of bar 50) to assume the position shown in FIG. 4 adjacent to the extending ends of the bars 50 and 52. At the same time that the bar 52 is folded, the clamp uprights 28 are folded toward one another as shown in FIG. 3 to assume the final storage position shown in FIG. 4.

The invention provides a support which can be clamped to a forwardly traveling section of gutter and which travels with the gutter as it supports the gutter at the proper level. Therefore, a long section of gutter can be produced without having to readjust supports for the gutter.

Preferred embodiments of the invention have been described in considerable detail. Many modifications and variations to the embodiments described will be apparent to those of ordinary skill in the art. For example, more or less than two wheels could be provided, a different type of frame could be provided, the support could be attached to the gutter using other means, and the support would not necessarily have to be foldable. In addition, it may be desirable to position the wheels relative to the support so that the support is generally balanced from end to end. Therefore, the invention should not be limited to the embodiments described but should be defined by the claims which follow.

I claim:

1. An apparatus for supporting a seamless gutter as it is being formed, comprising:
    a frame for supporting said gutter at a certain height above a ground surface;
    a clamp secured to said frame for releasable attachment to said gutter at said certain height;
    a rotatable wheel secured to said frame for rolling engagement with said ground surface as said gutter is being formed, said frame supporting said gutter at said certain height above said ground surface and said apparatus traveling with said gutter as said gutter is being formed; and
    a clamp support for adjusting the height of said clamp above said wheel to support said gutter at said certain height.

2. An apparatus as in claim 1, wherein said apparatus has two wheels and said wheels are laterally spaced apart with one of said wheels on one side of said gutter and another of said wheels on an opposite side of said gutter when said apparatus is clamped to said gutter.

3. An apparatus as in claim 2, wherein said wheels are aligned along a lateral axis which is substantially perpendicular to said gutter when said apparatus is clamped to said gutter.

4. An apparatus as in claim 1, wherein said apparatus has two clamps, and said clamps are longitudinally spaced apart in the direction of travel of said gutter with one said clamp in front of said wheel and the other said clamp behind said wheel.

5. An apparatus as in claim 4, wherein said wheel is longitudinally positioned between said clamps.

6. An apparatus as in claim 1, wherein said apparatus is foldable to a collapsed position.

7. An apparatus for supporting a seamless gutter as it is being formed, comprising:
    a frame for supporting said gutter at a certain height above a ground surface;
    a pair of longitudinally spaced apart clamps secured to said frame for releasable attachment to said gutter at said certain height;
    a pair of rotatable wheels rotatably secured to said frame for rolling engagement with a ground surface as said gutter is being formed, said wheels being laterally spaced apart with one said wheel on one side of said gutter and the other said wheel on the opposite side of said gutter when said apparatus is clamped to said gutter, and said wheels being longitudinally positioned between said clamps; and
    clamp supports for adjusting the height of said clamps above said wheels to support said gutter at said certain height;
    wherein said frame supports said gutter at said certain height above said ground surface and travels with said gutter as said gutter is being formed.

8. A method of supporting seamless gutter as it is being formed by a gutter forming machine, comprising the steps of:
    supplying a frame for supporting said gutter at a certain height above a ground surface;
    supplying a pair of longitudinally spaced apart clamps secured to said frame for releasable attachment to said gutter at said certain height;
    supplying a pair of rotatable wheels rotatably secured to said frame for rolling engagement with said ground surface as said gutter is being formed, said wheels being laterally spaced apart with one said wheel on one side of said gutter and the other said wheel on the opposite side of said gutter when said apparatus is clamped to said gutter, and said wheels being longitudinally positioned between said clamps; and
    securing said clamps to said gutter as said gutter extends from said gutter forming machine so that said frame supports said gutter above said ground surface and travels with said gutter as said gutter is being formed.

* * * * *